June 22, 1926.
E. F. BLISS
1,589,931
CONTROL SYSTEM FOR DYNAMO ELECTRIC MACHINES
Filed May 15, 1924
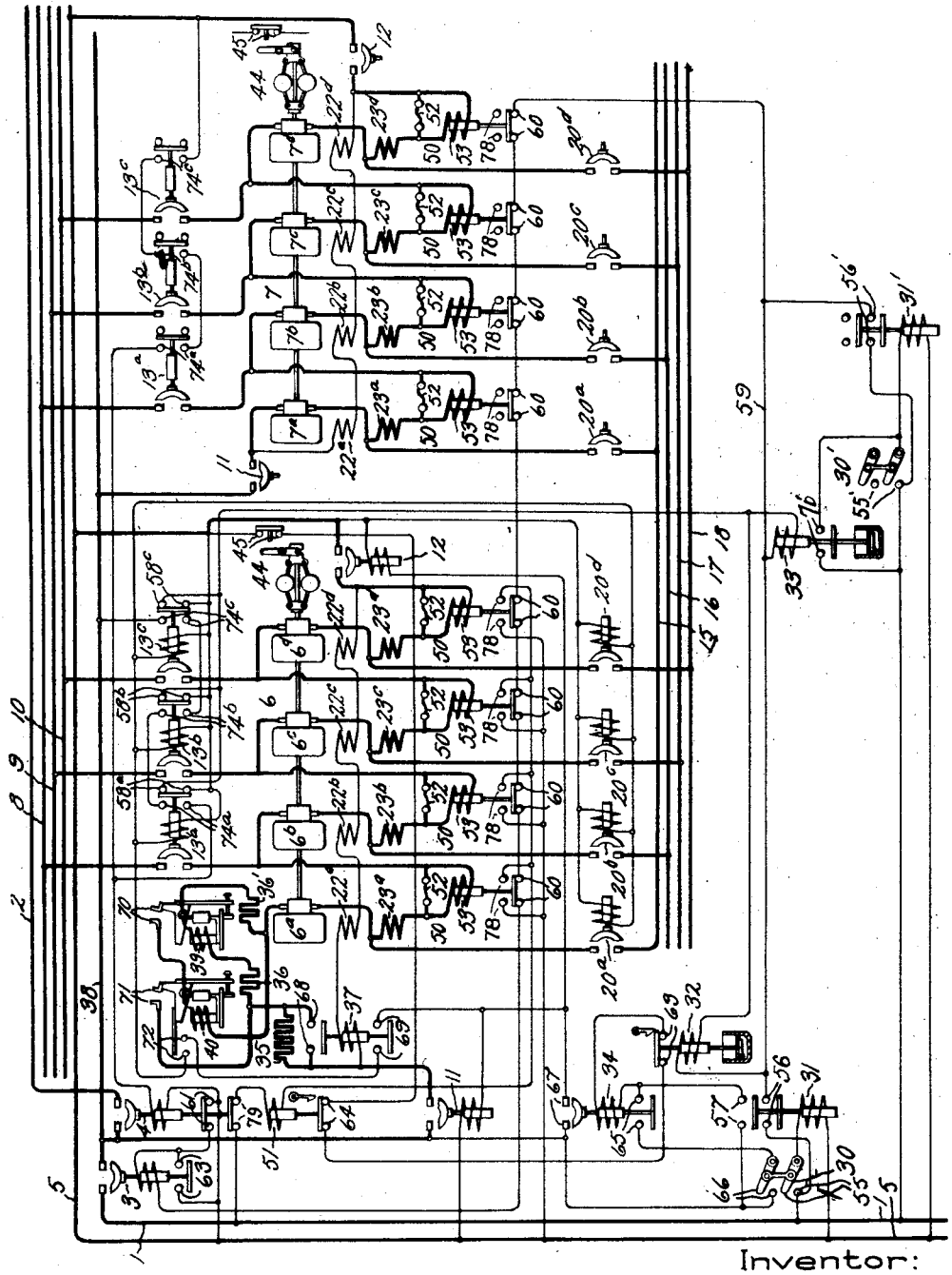
Inventor:
Elmer F. Bliss,
by
His Attorney.

Patented June 22, 1926.

1,589,931

UNITED STATES PATENT OFFICE.

ELMER F. BLISS, OF ALPLAUS, NEW YORK, ASSIGNOR TO GENERAL ELECTRIC COMPANY, A CORPORATION OF NEW YORK.

CONTROL SYSTEM FOR DYNAMO-ELECTRIC MACHINES.

Application filed May 15, 1924. Serial No. 713,614.

My invention relates to control systems for dynamo electric machines and particularly to control systems for balancer sets which are arranged to supply the intermediate circuits of multi-voltage direct current systems.

One object of my invention is to provide an arrangement whereby under certain predetermined conditions a balancer set is adapted automatically to be started and connected to a multi-voltage load circuit for the purpose of supplying energy thereto.

Another object of my invention is to provide an arrangement whereby another balancer set is automatically started and connected to the multi-voltage load circuit if the starting operation of a balancer set is not completed within a predetermined time.

Another object of my invention is to provide an arrangement for automatically shutting down a balancer set when it fails while in service and for automatically starting up another balancer set and connecting it to the multi-voltage load circuit to take the place of the disabled set.

Multi-voltage systems are used to some extent in electric elevator systems. In such systems it is very desirable that when a balancer set becomes disabled, while in operation, the supply circuit should be disconnected from the load circuit as soon as possible and the balancer set should remain connected to the multi-voltage circuit until the voltage of the load circuit has decreased below a predetermined value. The circuits of the elevator motors are thus maintained after the supply circuit is disconnected so that the elevator motors can feed into each other and into the different units of the balancer sets, thus preventing the speeds of the individual elevators from becoming excessive and effecting the operation of their overspeed safety devices.

Another object of my invention is to provide an arrangement for automatically disconnecting the supply circuit from the multi-voltage load circuit without disconnecting any of the balancer sets, which are in operation, from the multi-voltage load circuit, when a predetermined abnormal condition such as an overload occurs, and for disconnecting all of the balancer sets from the load circuit when the voltage thereof has subsequently decreased below a predetermined value.

Another object of my invention is to provide an arrangement whereby as soon as all of the balancer sets have been disconnected from multi-voltage load circuit in response to an abnormal condition on one of the balancer sets, all of these balancer sets, except the disabled one, are again automatically started and connected to the load circuit.

My invention will be better understood from the following description when taken in connection with the single figure of the accompanying diagrammatic drawing and its scope will be pointed out in the appended claims.

Referring to the drawing, 1 and 2 represent respectively the positive busses of a direct current supply circuit and the main circuit of a multi-voltage direct current load circuit which are arranged to be connected together when the circuit breakers 3 and 4 are closed. The negative bus 5 is common to both circuits. 6 and 7 represent two balancer sets which are arranged to maintain the voltage constant between the intermediate busses 8, 9 and 10 and the main positive and negative busses 2 and 5 of the multi-voltage load circuit. Each balancer set consists of four units the rotors of which are mechanically connected together. The armature windings of the units of each set are electrically connected in series and are arranged to be connected across the supply circuit 1—5 when the circuit breakers 11 and 12 associated therewith, and the circuit breaker 3, which is common to both balancer sets, are closed. The connections between the adjacent armature windings of the units of each set are arranged to be connected to the intermediate busses of the load circuits 8, 9 and 10 so that one unit of each set is connected across each low voltage circuit of the multi-voltage load circuit. As shown in the drawing, three circuit breakers 13$^a$, 13$^b$ and 13$^c$ are associated with each set for accomplishing this result. The circuit breakers 13$^a$, 13$^b$ and 13$^c$ associated with the balancer set 6 are arranged respectively to connect the intermediate bus 8 to the common connection between the armature windings of the units 6$^a$ and 6$^b$, to connect the intermediate bus 9 to the common connection between the armature winding of the units 6$^b$ and 6$^c$, and to connect the intermediate bus 10 to the common connection between the armature windings of the units 6$^c$ and 6$^d$.

The circuit breakers $13^a$, $13^b$ and $13^c$, associated with the balancer set 7 are arranged respectively to connect the intermediate bus 8 to the common connection between the armature windings of the units $7^a$ and $7^b$, to connect the intermediate bus 9 to the common connection between the armature windings of the units $7^b$ and $7^c$, and to connect the intermediate bus 10 to the common connection between the armature windings of the units $7^c$ and $7^d$. Therefore, it will be observed that when the common circuit breakers 3 and 4 are closed and the circuit breakers 11, 12, $13^a$, $13^b$ and $13^c$ of one of the balancer sets are closed, the respective set is operative in a manner well known in the art to maintain constant the voltages across the intermediate circuits of the multi-voltage load circuit.

When both of the balancer sets are operating in parallel it is desirable to maintain the load on the two sets substantially equal. Therefore the equalizer busses 15, 16, 17 and 18 are provided respectively for the units $6^a$ and $7^a$, the units $6^b$ and $7^b$, the units $6^c$ and $7^c$, and the units $6^d$ and $7^d$ of the two balancer sets. The circuit breakers $20^a$, $20^b$, $20^c$ and $20^d$ are provided with each set to establish the connection between the four units thereof and the respective equalizer busses.

Each balancer set is provided with the shunt field winding $22^a$, $22^b$, $22^c$ and $22^d$, one for each unit thereof. The shunt field windings of each set are successively connected in series in a permanently closed circuit which also includes the successively connected armature windings of the same set. By having the shunt field windings and the armature windings permanently connected together in this manner there is no danger of the set running away due to the field circuit being opened before the armature circuit is opened while the set is being shut down.

Each set is also provided with the series field windings $23^a$, $23^b$, $23^c$ and $23^d$ which are connected in series with the armature windings of the respective units thereof.

Each balancer set is arranged to be started by the operation of a master switch associated therewith which may be operated either manually or automatically in response to a predetermined condition. The operation of each master switch effects the connection of the associated balancer set to the supply circuit 1—5 with suitable current limiting means in series therewith to prevent an excessive starting current flowing through the set during starting. Automatic switching means are provided for decreasing the current limiting means as the speed of the set increases until the set has reached its normal speed when the intermediate bus circuit breakers $13^a$, $13^b$ and $13^c$ and the equalizer bus circuit breakers $20^a$, $20^b$, $20^c$ and $20^d$ thereof are closed. After the intermediate bus circuit breakers $13^a$, $13^b$ and $13^c$ are closed, the main circuit breaker 4, which is common to all the balancer sets, is closed if it has not already been closed by the starting of another one of the sets.

In order to simplify the drawing, I have shown in detail only the control apparatus for starting, shutting down and protecting the balancer set 6 since the control apparatus, associated with the balancer set 7, may be the same as that shown associated with the balancer set 6.

As shown in the drawing, the balancer set 6 is arranged to be started by the closing of a manually operated control switch 30, which completes the circuit of a master relay 31. A similar control switch 30' and master relay 31' is provided for controlling the operation of the balancer set 7. The master relay of each set, when energized, completes the circuits of the time relays 32 and 33 associated therewith. Each time relay 32 is arranged to shut down the associated balancer set and prevent it from being restarted in case it is not connected to the load circuit within a predetermined time after the starting switch is closed. Each time relay 33 is arranged to effect the starting up of another balancer set in case the associated set is not connected to the load circuit within a definite time after the starting switch therefor is closed or the associated set fails while in operation. As shown in the drawing, the time relay 33 associated with the balancer set 6 is arranged to effect the starting of the balancer set 7 but it is obvious to one skilled in the art that the relay 33 could be arranged to effect the starting of a third set (not shown) which would function as an emergency set to take the place of the set 6 when it fails. This emergency set could also be placed under the control of the relay 33 associated with the set 7.

Each master relay also effects the energization of an associated master control contactor 34 and the closing of the common circuit breaker 3, if it is not already closed due to the energization of the master relay 31', to connect the positive bus 38 of the control circuit 38—5 to the positive bus 1 of the supply circuit 1—5. Each contactor 34, when energized, also effects the energization of the circuit breakers 11 and 12 associated with the respective balancer set to connect the permanently closed circuit which includes the armature windings and the shunt field windings $22^a$, $22^b$, $22^c$ and $22^d$ of the set across the control circuit 38—5. The resistor 35 and the starting resistors 36 and 36' of the associated set are also connected in the permanently closed circuit. The circuit breakers 11 and 12 are so arranged that the shunt field windings of the set are connected directly across the control circuit, and the armature windings are connected across the control circuit with the resistor 35 and the starting resistors 36 and 36' in series therewith. The resistor 35 is provided in the armature circuit at this time to allow the shunt field current to build up before any appreciable amount of current flows through the armature circuit. It thus prevents the balancer set from starting until the shunt field current has been increased to a predetermined value. The resistor 35 also serves as a discharge resistor for the shunt field windings when the set is shut down.

In order that the set may start rotating as soon as the field current builds up to a predetermined value, a relay 37 is connected in series with the shunt field windings and is arranged to short circuit the resistor 35 as soon as the field current exceeds a predetermined value. After the relay 37 has operated the armature windings of the set are connected in series across the supply circuit with only the starting resistors 36 and 36' in series therewith so that sufficient current flows through the armatures to cause the set to start rotating. The series contactors 39 and 40 are provided successively to short circuit the starting resistors 36' and 36 as the starting current decreases.

Each balancer set is provided with an overspeed device 44 which is arranged to open the contacts 45 associated therewith when the speed of the set exceeds a predetermined value. The contacts 45 are arranged in any well known manner so that they have to be reset manually. The opening of the contacts 45 effects, in a manner hereinafter described, the shutting down of the respective set.

In order to protect each unit of each balancer set against overloads, an overload responsive device 50 is provided in each individual armature circuit.

Each overload responsive device preferably consists of a fuse 52 and a relay 53 connected in shunt thereto and arranged so that it does not operate until after the fuse has blown. Since it is desirable to shut down a balancer set only in response to sustained overload it is necessary to provide an overload responsive device which has a certain time delay in operating. As is well known in the art, a fuse has this particular feature. Another advantage of the particular arrangement shown is that the resistance of the armature circuit is not materially increased under normal operating conditions as would be the case if ordinary time-delayed overload relays were used in place of the arrangement shown.

Each relay 53 controls contacts in the closing circuit of the circuit breaker 3 so that when any one of the relays is operated the circuit breaker 3 is opened to disconnect the control circuit 38—5 from the supply circuit 1—5. Therefore an overload on any unit of either set effects the disconnection of the supply circuit from all of the sets that are in operation. These sets, however, are arranged in a manner hereinafter described to remain connected to the load circuit until the voltage across the control circuit 38—5 decreases below a predetermined value.

The relays 53 associated with each set are also arranged to effect the operation of a lock-out relay 51 associated with the respective set which is arranged to prevent the set from being started after it has shut down.

The operation of the system shown is as follows:—When both of the balancer sets are shut down, the control apparatus therefor is in the position shown in the drawing. Since all of the circuit breakers 3, 4, 11, 12, 13ª, 13ᵇ, 13ᶜ, 20ª, 20ᵇ, 20ᶜ and 20ᵈ are open, the positive bus 1 of the supply circuit is disconnected from the positive bus 2 of the load circuit and each balancer set is disconnected from the supply and load circuits and from the equalizer busses 15, 16, 17 and 18.

When it is necessary to put one of the balancer sets into operation, the starting switch associated therewith is closed. If the balancer set 6 is one to be started, the switch 30 is closed, whereas if the balancer set 7 is one to be started the switch 30' is closed.

For the purpose of this description it will be assumed that the switch 30 is closed to effect the starting of the balancer set 6.

The closing of the contacts 55 of the switch 30 connects the coil of the master relay 31 across the supply circuit 1—5 so that the relay 31 operates and closes its contacts 56 and 57. The closing of the contacts 56 completes a circuit for the time relay 32 and 33. This circuit is from the positive bus 1 of the supply circuit, through the contacts 56 of the relay 31, coils of the time relays 32 and 33 in parallel, contacts 58ª, 58ᵇ and 58ᶜ of the intermediate bus circuit breakers 13ª, 13ᵇ and 13ᶜ in parallel to the negative bus 5. Both of these time relays begin to time.

The closing of the contacts 56 also completes a circuit for the closing coil of the circuit breaker 3. This circuit is from the positive bus 1 through the contacts 56 of the relay 31, conductor 59, contacts 60 of all of the relays 53 of both balancer sets in series, closing coil of the circuit breaker 3, contacts 61 on the circuit breaker 4 to the negative bus 5. The closing of the circuit breaker 3 connects the positive supply bus to the positive bus 38 of the control circuit 38—5. It will be observed that the circuit of the closing coil of the circuit breaker 3 is also arranged to be completed by the contacts 56' of the relay 31' which are connected in shunt to the contacts 56. Therefore, the circuit breaker 3 is arranged to be closed to energize the control circuit 38—5 whenever either set is started.

When the circuit breaker 3 closes, the closing of the auxiliary contacts 63 thereof shunts the contacts 61 of the circuit breaker 4 so that the circuit of the coil of the circuit breaker 3 remains energized after the circuit breaker 4 closes. With this arrangement, it is possible to close the circuit breaker 3 only when the circuit breaker 4 is open. Therefore when the circuit breaker 3 is opened, in a manner hereinafter described, to disconnect all of the sets that are in operation from the supply circuit when one of the sets fails, the circuit breaker 3 cannot be closed to effect the starting up of another set until all of the sets have been disconnected from the load circuit by the opening of the circuit breaker 4. Under the above mentioned conditions, the circuit breaker 4 is arranged to remain closed in a manner hereinafter described until the voltage across the control circuit, which, so long as the circuit breaker 4 remains closed, is the same as the voltage across the load circuit 2—5, decreases below a predetermined value.

The closing of the contacts 57 of the master relay 31 completes a circuit for the master contactor 34 associated with the set 6. This circuit is from the positive bus 38 of the control circuit, through the contacts 57 of the master relay 31, coil of the contactor 34, contacts 63 of the time relay 32, contacts 64 of the lockout relay 51, associated with the set 6, contacts 45 of the overspeed switch 44 to the negative bus 5. The closing of the auxiliary contacts 65 of the contactor 34 closes a circuit through the contacts 66 of the starting switch 30 which is in shunt to the contacts 57 of the master relay 31 so that in case the relay 31 fails, the circuit of the contactor 34 remains closed after the relay 31 opens its contacts 57. The closing of the main contacts 67 of the contactor 34 completes the circuit of the closing coils of the circuit breakers 11 and 12 to connect the set 6 across the control circuit 38—5. This circuit is from the positive bus 38 of the control circuit, through the contacts 67 of the contactor 34, coils of the circuit breakers 11 and 12 in parallel, to the negative bus 5.

When the circuit breakers 11 and 12 close, the shunt fields $22^a$, $22^b$, $22^c$, and $22^d$ are connected in series with the relay 37 across the control circuit 38—5, and the armature windings, the series field windings $23^a$, $23^b$, $23^c$ and $23^d$ of the four units of the set, the resistors 35, 36 and 36' and the coil of the series contactor 39 are also connected in series across the control circuit 38—5. Due to the high resistance of the resistor 35, however, the set does not start rotating nor does the series contactor 39 close its contacts.

When the field current has reached a predetermined value the relay 37 operates and closes its contacts 68 and 69. The closing of the contacts 68 short circuits the resistor 35 so that the armature windings of the balancer set are connected across the control circuit with the starting resistors 36 and 36' and the series contactor 39 in series therewith. The rush of current through the series contactor 39, when the resistor 35 is short circuited, does not cause it to close its contacts 70. When, however, the starting current has decreased to a predetermined value, the contactor 39 closes its contacts 70 thereby completing a shunt circuit around the starting resistor 36'. This shunt circuit includes the coil of the series contactor 40. When starting current decreases below another predetermined value the series contactor 40 operates to close its contacts 71, thereby short circuiting both of the resistors 36 and 36' and also the coil of the series contactor 39. Therefore the closing of the series contactor 40 connects the four armature windings of the balancer set directly across the control circuit 38—5.

The series contactor 40 is also arranged to close the contacts 72 which, when closed, completes the circuits of the intermediate bus circuit breakers $13^a$, $13^b$ and $13^c$ and the equalizer circuit breakers $20^a$, $20^b$, $20^c$ and $20^d$. The circuits for these circuit breakers are from the positive bus 38 of the control circuit, through the contacts 67 of the contactor 34, contacts 69 of the field relay 37, contacts 72 of the series contactor 40, then in parallel through the coils of the circuit breakers $13^a$, $13^b$, $13^c$, $20^a$, $20^b$, $20^c$, $20^d$, to the negative bus 5.

The closing of auxiliary contacts $74^a$, $74^b$ and $74^c$ of the circuit breakers $13^a$, $13^b$ and $13^c$ completes the circuit of the closing coil of the circuit breaker 4 to connect the positive bus 2 of the load circuit to the positive bus 38 of the control circuit. This circuit of the closing coil is from the positive bus 38 of the control circuit through the contacts $74^c$ of the circuit breaker $13^c$, contacts $74^b$ of the circuit breaker $13^b$, contacts $74^a$ of the circuit breaker $13^a$, closing coil of the circuit breaker 4, to the negative bus 5. The closing of the circuit breaker 4 completes the connection of the set to the multi-voltage load circuit so that all of the busses of the multi-voltage load circuit are now energized.

When the intermediate bus circuit breakers $13^a$, $13^b$ and $13^c$ are closed the opening of their respective contacts $58^a$, $58^b$ and $58^c$ interrupts the heretofore described circuits for the time relays 32 and 33 so that these relays are prevented from operating.

When it is desired to shut the balancer set 6 down, under normal conditions, the starting switch 30 thereof is opened so that the master relay 31 is deenergized. The opening of the contacts 66 of the hand switch deenergizes the contactor 34 which, by opening its contacts 67, opens the circuits of the closing coils of the circuit breakers 11, 12, 13$^a$, 13$^b$, 13$^c$, 20$^b$, 20$^c$, and 20$^d$ to disconnect the balancer set from all of the busses. As the set slows down, the field current decreases so that the field relay 37 opens the short circuit around the resistor 35 which acts as a discharge resistor. The series contactor 40 opens to remove the short circuit around the starting resistors 36 and 36′ when the circuit breakers 11 and 12 open. If the balancer set 7 is not in operation when the switch 30 is open, the opening of the contacts 56 of the master relay associated therewith deenergizes the coil of the circuit breaker 3, which in turn deenergizes the coil of the circuit breaker 4 so that all of the control apparatus is restored to the position shown in the drawing. If, however, the set 7 is in operation when the switch 30 is opened, the circuit of the closing coil of the circuit breaker 3 remains completed through the contacts 56′ of the master relay 30′ and the circuit of the closing coil of the circuit breaker 4 remains completed through the auxiliary contacts 74$^a$, 74$^b$ and 74$^c$ on the intermediate bus circuit breakers 13$^a$, 13$^b$ and 13$^c$ associated with the set 7.

In case the balancer set 6 fails to complete its starting operation within a predetermined time after the starting switch 30 thereof is closed, the time relays 32 and 33 have time to complete their operation before the intermediate bus circuit breakers 13$^a$, 13$^b$ and 13$^c$ are closed. The time relay 32, by opening its contacts 63, opens the heretofore described circuit of the master contactor 34 so that the balancer set 6 is shut down. The relay 32 is made so that its contacts have to be reset by hand after they have opened. Therefore, the balancer set 6 cannot be restarted until after an inspector or some other person has reset the relay 32.

The contacts 76 of the time relay 33 are connected in the circuit of the master relay of another balancer set so that this other set is started automatically when the time relay 33 closes its contacts 76. As shown in the drawing, the contacts 76 are connected in parallel with the contacts 55′ of the starting switch 30′ of the balancer set 7 so that the set 7 is started automatically in case the balancer set fails to start. It is evident, however, to one skilled in the art, that the contacts 76 of the time relay 33 associated with the set 6, may be connected in the circuit of the master relay 31 of another set not shown. While I have shown only two balancer sets it is obvious that my invention is not limited to a system having only two sets but is applicable to a system having any desired number of sets.

In case of an excessive overload on any one of the units of the balancer sets 6 and 7, the fuse 52 in armature circuit of the overloaded unit blows so that the overload relay 53 which is normally connected in shunt around the fuse receives all of the current flowing through the respective armature winding. This overload relay 53 then opens its contacts 60 and closes its contacts 78. By opening of its contacts 60 the relay 53 opens the heretofore described circuit of the coil of the common circuit breaker 3 so that the positive bus 38 is disconnected from the positive supply bus 1. This allows the voltage of the whole balancer system to die down as the speed of the balancer sets decreases since the supply circuit is disconnected from the load circuit.

Since the closing coil circuits of the circuit breaker 4 and all of the circuit breakers 11, 12. 13$^a$, 13$^b$, 13$^c$, 20$^a$, 20$^b$, 20$^c$ and 20$^d$ are connected across the control circuit 38—5, it is evident that so long as these circuits remain closed and the voltage across the control circuit remains above a predetermined value the circuit breakers will remain closed. Therefore since the overload relays 53 are not arranged to open any of these closing circuits all of the balancer sets, which are in operation when an overload occurs, remain connected to the load circuit after the circuit breaker 3 opens until the voltage across the control circuits 38—5, which is connected to the main circuit 2—5 of the load circuit by the circuit breaker 4, decreases below a predetermined value.

When the circuit breaker 4 opens so that its auxiliary contacts 61 are closed and the current through the armature winding of the overloaded unit has decreased sufficiently to allow its overload relay 53 to close its contacts 60, the heretofore described circuit for the closing coil of the circuit breaker 3 is completed through the contacts 60 of all of the overload relays 53 and the contacts of the master relays which may be energized. It will be observed that it is necessary that the contacts 60 of all of the overload relays 53 must be closed, and the circuit breakers must be open before the circuit breaker 3 can reclose. If more than one set is in operation when the fault occurs, the set in which the fault does not occur, is started up and connected to the load circuit in the manner heretofore described as soon as the circuit breaker 3 recloses. The set that causes the shut down, however, is prevented from starting up after the circuit breaker 4 opens, in the following manner. The closing of the contacts 78 of the overload relay 53 that is operated by the overload completes a circuit for the lock-out relay 51 of the respective set. This circuit is from the positive supply bus 1 through the coil of the lock-out relay 51, contacts 78 of the operated overload relay 53 to the negative bus 5. Since the lockout relay 51 has to be reset by hand, the opening of its contacts 64, which are in the heretofore traced circuit of the master contactor 34, prevents the balancer set from being started again until it has been inspected.

When the circuit breakers 13ª, 13ᵇ and 13ᶜ of the set on which the overload occurred open, the heretofore described circuit for the time relays 32 and 33 is completed. Since the lock-out relay 51 associated with the particular set operates in the manner above described, to prevent the set from being started, it will be evident that the time relays 33 associated therewith will effect the automatic starting up of another set, to replace the disabled set.

If for any reason the speed of a balancer set should increase above the setting of the overspeed switch 44 associated therewith, this switch opens its associated contacts 45, thereby deenergizing the master contactor 34 of the set. The opening of the master contactor opens the circuits of the coils of circuit breaker 11, 12, 13ª, 13ᵇ, 13ᶜ, 20ª, 20ᵇ, 20ᶜ and 20ᵈ of the set so that the set is completely disconnected from the load circuit. The opening of the intermediate bus circuit breakers 13ª, 13ᵇ, and 13ᶜ effect in a manner heretofore described the opening of the circuit breaker 4, if no other set is in operation, and the operation of the time relays 32 and 33 to lock out the set and to effect the starting of another set.

In case the field circuit of a balancer set should fail, the field relay 37 opens its contacts 68 and 69. The opening of the contacts 68 inserts the resistor 35 in series with the set. The resistance of the resistor 35 is so high that the current through the armature windings of the set is reduced to a very small value. The opening of the contacts 69 opens the circuits of the closing coils of the intermediate bus circuit breakers 13ª, 13ᵇ and 13ᶜ. As heretofore described the opening of these intermediate bus circuit breakers effects the shutting down and locking out of the set that has failed and the starting of another set.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:—

1. In combination, a direct current supply circuit, a multi-voltage direct current load circuit, a balancer set arranged to supply the intermediate circuits of said multi-voltage circuit, automatic switching means for connecting said balancer set to said supply circuit to effect the starting of said set, means for effecting the operation of said automatic switching means, and automatic switching means operative in response to the starting of said balancer set to connect said balancer set to the intermediate circuits of said multi-voltage load circuit.

2. In combination, a direct current supply circuit, a multi-voltage direct current load circuit, a balancer set arranged to supply the intermediate circuits of said multi-voltage circuit comprising a plurality of dynamo electric machines having their rotors mechanically connected together and their armature windings electrically connected in series, current limiting means, switching means arranged to connect said armature windings and said current limiting means in series across said supply circuit to start said set, automatic switching means operative in response to the starting current for decreasing the amount of current limiting means in series with the armature windings, and switching means for automatically connecting said armature windings across different intermediate circuits of said multi-voltage load circuit when said current limiting means has been decreased a predetermined amount.

3. In combination, a direct current supply circuit, a multi-voltage direct current load circuit, a balancer set arranged to supply the intermediate circuits of said multi-voltage circuit, automatic switching means for connecting said set to said supply circuit and for controlling the connection thereto to effect the starting of said set, means for effecting the operation of said automatic switching means, and switching means for automatically effecting the connection of said balancer set to the intermediate conductors of said multi-voltage circuit and the subsequent connection of said supply circuit to the main conductors of said multi-voltage load circuit after said set has been started.

4. In combination, a direct current supply circuit, a multi-voltage direct current load circuit, a balancer set arranged to supply the intermediate circuits of said multi-voltage load circuit comprising a plurality of dynamo electric machines having their rotors mechanically connected together and their armature windings electrically connected in series, current limiting means, switching means arranged to connect said armature windings and said current limiting means in series across said supply circuit to start said set, automatic switching means operative in response to the starting current for decreasing the amount of current limiting means in series with the armature windings, and switching means operative automatically when said current limiting means has been decreased a predetermined amount for effecting the connection of said balancer set to the intermediate conductors of said multi-voltage circuit and the connection of said supply circuit to the main conductors of said multi-voltage load circuit.

5. In combination, a direct current supply circuit, a multi-voltage direct current load circuit, a balancer set arranged to supply the intermediate circuits of said multi-voltage circuit, automatic switching means for connecting said set to said supply circuit and for controlling the connection thereto to effect the starting of said set, means arranged to effect the operation of said automatic switching means, switching means operative in response to a predetermined condition of said automatic switching means for effecting the connections between said balancer set and the intermediate conductors of said multi-voltage load circuit, and means operative in response to a predetermined condition of said last mentioned switching means for establishing the connection between said supply circuit and the main conductors of said multi-voltage load circuit.

6. In combination, a direct current supply circuit, a multi-voltage direct current load circuit, a balancer set arranged to supply the intermediate circuits of said multi-voltage circuit, automatic switching means for connecting said set to said supply circuit and for controlling the connection thereto to effect the starting of said set, means arranged to effect the operation of said automatic switching means, switching means operative in response to a predetermined condition of said automatic switching, means for effecting the connections between said balancer set and the intermediate conductors of said multi-voltage load circuit, and automatic switching means operative in response to the establishment of the connections between said set and the intermediate conductors of said load circuit for effecting the connection between said supply circuit and the main conductors of said multi-voltage load circuit.

7. In combination, a direct current supply circuit, a multi-voltage direct current load circuit, a plurality of balancer sets arranged to supply the intermediate circuits of said multi-voltage load circuit, each balancer set comprising a plurality of dynamo electric machines having these rotors mechanically connected together and their armature windings electrically connected in series, equalizer conductors for the corresponding machines of the plurality of sets, automatic switching means associated with each set for connecting the respective set to the supply circuit and controlling the connection thereto to effect the starting of the set, means arranged to effect the operation of each one of said switching means, and switching means associated with each set and operative in response to a predetermined condition of the automatic switching means of the respective set for effecting the connection between the respective set and the equalizer conductors.

8. In combination, a direct current supply circuit, a multi-voltage direct current load circuit, a balancer set for supplying the intermediate circuits of said multi-voltage load circuit, switching means for connecting said supply circuit to the main circuit of said multi-voltage load circuit, switching means for connecting said balancer set across the intermediate circuits of said load circuit, electroresponsive means operative in response to the voltage across the main circuit of said load circuit for controlling said last mentioned switching means, and overload responsive means for controlling the opening of said first mentioned means whereby the occurrence of an overload causes said supply circuit to be disconnected from the main circuit of said load circuit and said balancer set remains connected across the intermediate circuits of the load circuit until the voltage across the main circuit thereof has decreased below a predetermined value.

9. In combination, a direct current supply circuit, a multi-voltage direct current load circuit, a balancer set for supplying the intermediate circuits of said multi-voltage load circuit comprising a plurality of dynamo electric machines having their rotors mechanically connected together and their armature windings electrically connected in series, switching means for connecting said supply circuit to the main circuit of said multi-voltage load circuit, switching means for connecting said set to the load circuit, and overload responsive means connected in the armature circuit of said set for controlling said first mentioned switching means.

10. In combination, a direct current supply circuit, a multi-voltage direct current load circuit, a balancer set for supplying the intermediate circuits of said multi-voltage load circuit comprising a plurality of dynamo electric machines having their rotors mechanically connected together and their armature windings electrically connected in series, electroresponsive switching means for connecting said supply circuit to the main circuit of said multi-voltage load circuit, switching means for connecting said set to the load circuit, a fuse in series with each armature winding of said set, a relay connected in shunt around each fuse and arranged so that it does not operate until its respective fuse has blown, and a circuit for said electroresponsive switching means controlled by said relays.

11. In combination, a direct current supply circuit, a multi-voltage direct current load circuit, a balancer set for supplying the intermediate circuits of said multivoltage load circuit comprising a plurality of dynamo electric machines having their rotors mechanically connected together and their armature windings electrically connected in series, a shunt field winding for each one of said machines, a resistor, switching means arranged to connect said armature windings and said resistor in series across said supply circuit and to connect all of said shunt field windings in series across said supply circuit, and means responsive to the shunt field current for controlling the connection of said resistor in the armature circuit of said set.

12. In combination, a direct current supply circuit, a multi-voltage direct current load circuit, a balancer set for supplying the intermediate circuits of said multi-voltage load circuit comprising a plurality of dynamo electric machines having their rotors mechanically connected together and their armature windings electrically connected in series, field windings for said machines, a control circuit, switching means for connecting said supply circuit to said control circuit, switching means arranged to connect said armature windings and said field windings across said control circuit to effect the starting of said set, switching means arranged to connect each armature winding across a different intermediate circuit of said load circuit, and overload responsive means for controlling the operation of said first mentioned switching means.

13. In combination, a direct current supply circuit, a multi-voltage direct current load circuit, a balancer set for supplying the intermediate circuits of said multi-voltage load circuit comprising a plurality of dynamo electric machines having their rotors mechanically connected together and their armature windings electrically connected in series, field windings for said machines, a control circuit, switching means for connecting said supply circuit to said control circuit, switching means arranged to connect said armature windings and said field windings across said control circuit to effect the starting of said set, switching means arranged to connect each armature winding across a different intermediate circuit of said load circuit, means operative in response to the voltage across the control circuit for controlling said two last mentioned switching means, and overload responsive means in the circuit of each armature winding for controlling said first mentioned switching means.

14. In combination, a direct current supply circuit, a multi-voltage direct current load circuit, a balancer set for supplying the intermediate circuits of said multi-voltage load circuit comprising a plurality of shunt dynamo electric machines having their rotors mechanically connected together, a permanently closed circuit having all of the armature windings of said machines and all of the shunt field windings of said machines successively arranged therein, automatic switching means for connecting said closed circuit to said supply circuit and for controlling the connection thereto whereby said field windings and said armature windings are connected in parallel across said supply circuit to effect the starting of said set, and switching means for connecting each armature winding across a different intermediate circuit of said load circuit.

15. In combination, a direct current supply circuit, a multi-voltage direct current load circuit, a balancer set for supplying the intermediate circuits of said multi-voltage load circuit comprising a plurality of shunt dynamo electric machines having their rotors mechanically connected together, a permanently closed circuit having all of the armature windings of said machines and all of the shunt field windings of said machines successively arranged therein, a control circuit, switching means for connecting said supply circuit to said control circuit, switching means for connecting said closed circuit to said control circuit whereby said field windings and said armature windings are connected in parallel across said control circuit, and switching means arranged to connect said control circuit across the main circuit of said load circuit and each armature winding across a different intermediate circuit of said load circuit.

16. In combination, a direct current supply circuit, a multi-voltage direct current load circuit, a balancer set for supplying the intermediate circuits of said multi-voltage load circuit comprising a plurality of dynamo electric machines having their rotors mechanically connected together, a permanently closed circuit having all of the armature windings of said machines and all of the shunt field windings of said machines successively arranged therein, a control circuit, switching means for connecting said supply circuit to said control circuit, switching means for connecting said closed circuit to said control circuit whereby said field windings and said armature windings are connected in parallel across said control circuit, switching means arranged to connect said control circuit across the main circuit of said load circuit and each armature winding across a different intermediate circuit of said load circuit, means responsive to the voltage across said control circuit for controlling the opening of said last two mentioned switching means, a fuse in the circuit of each armature winding, a relay connected in shunt around each fuse and arranged so that it does not operate until said fuse has blown, and means controlled by said relays for effecting the opening of said first mentioned switching means when any one of said fuses blows.

17. In combination, a direct current supply circuit, a multi-voltage direct current load circuit, a balancer set for supplying the intermediate circuits of said multi-voltage circuit comprising a plurality of shunt dynamo electric machines having their rotors mechanically connected together, current limiting means, a permanently closed circuit having the shunt field windings and the armature windings of said machine successively connected therein and including said current limiting means, means for connecting said closed circuit to said supply circuit whereby the shunt field windings are connected in series directly across the supply circuit and the armature winding and the current limiting means are connected in series across the supply circuit, means for decreasing the amount of current limiting means in series with said armature windings, and means for connecting said balancer set to said multi-voltage circuit.

18. In combination, a direct current supply circuit, a multi-voltage direct current load circuit, a balancer set for supplying the intermediate circuits of said multi-voltage circuit comprising a plurality of shunt dynamo electric machines having their rotors mechanically connected together, current limiting means, a permanently closed circuit having the shunt field windings and the armature windings of said machine successively connected therein and including said current limiting means, means for effecting the starting of said set arranged to connect said closed circuit to said supply circuit whereby all of the shunt field windings are connected in series across the supply circuit and the armature windings and the current limiting means are connected in series across the supply circuit, automatic switching means operative in response to the starting current through said armature windings for decreasing the amount of current limiting means in series with the armature windings, and switching means for automatically connecting said armature windings across different intermediate circuits of said multi-voltage load circuit when said current limiting means has been decreased a predetermined amount.

19. In combination, a direct current supply circuit, a multi-voltage direct current load circuit, a balancer set for supplying said multi-voltage load circuit, automatic switching means for connecting said set to said supply circuit and for controlling the connection thereto to effect the starting of the set, other switching means for automatically connecting said set to the load circuit when the starting operation has been completed, starting means adapted to be operated to effect the operation of said automatic switching means, and means for disconnecting said set from said supply circuit if said starting operation is not completed within a predetermined time.

20. In combination, a direct current supply circuit, a multi-voltage direct current load circuit, a balancer set for supplying said multi-voltage load circuit, automatic switching means for connecting said set to said supply circuit and for controlling the connection thereto to effect the starting of the set, other switching means for automatically connecting said set to the load circuit when the starting operation has been completed, starting means arranged to be operated to effect the operation of said automatic switching means, a time relay arranged to effect the disconnection of said set from said supply circuit, a circuit for said relay arranged to be completed in response to the operation of said starting means, and contacts in said relay circuit controlled by said other switching means whereby said relay circuit is opened before said time relay effects the disconnection of the set from the supply circuit if the starting operation is completed within a predetermined time.

21. In combination, a direct current supply circuit, a multi-voltage direct current load circuit, a plurality of balancer sets for supplying said multi-voltage load circuit, automatic switching means associated with each set for connecting the respective set to the supply circuit and for controlling the connection thereto to effect the starting of the set, other switching means associated with each set for automatically effecting the connection thereof to the load circuit when the starting operation thereof has been completed, starting means arranged to be operated to effect the operation of one of said automatic switching means to start one of said balancer sets, and means for effecting the operation of another of said automatic switching means to start another of said balancer sets if the set which is controlled by said first mentioned starting means is not connected to the load circuit within a predetermined time after it has been started.

22. In combination, a direct current supply circuit, a multi-voltage direct current load circuit, a plurality of balancer sets for supplying said multi-voltage load circuit, automatic switching means associated with each set for connecting the respective set to the supply circuit and for controlling the connection thereto to effect the starting of the set, other switching means associated with each set for automatically effecting the connections thereof to the load circuit when the starting operation has been completed, starting means arranged to be operated to effect the operation of one of said automatic switching means to start one of said balancer sets, a time relay arranged to effect the starting of another one of said automatic switching means, a circuit for said time relay arranged to be completed in response to the operation of said starting means, and contacts in the circuit of said time relay controlled by the said other switching means associated with the balancer set which is arranged to be started by the operation of said starting means.

23. In combination, a direct current supply circuit, a multi-voltage direct current load circuit, a plurality of balancer sets for supplying said multi-voltage load circuit, a control circuit, automatic switching means associated with each set for connecting the respective set to the control circuit and for controlling the connections thereto to effect the starting of the set and for connecting the respective set to the load circuit, starting means associated with each set arranged to be operated to effect the operation of the automatic switching means of the respective set, and a common switching means for connecting said supply circuit to said control circuit arranged to be operated automatically in response to the operation of any one of said starting means.

24. In combination, a direct current supply circuit, a multi-voltage direct current load circuit, a plurality of balancer sets for supplying said multi-voltage load circuit, each balancer set having the rotors thereof mechanically connected together and the armature windings thereof electrically connected in series, a control circuit, automatic switching means associated with each set for connecting the series-connected armature windings of the respective set across said control circuit to effect the starting of the set and for connecting the common connections between the adjacent armature windings of the respective set to the intermediate conductors of the multi-voltage load circuit after the set has been started, starting means associated with each set arranged to be operated to effect the operation of the automatic switching means of the associated set, switching means for connecting said supply circuit to said control circuit, and a common switching means for connecting the control circuit to the main conductors of the load circuit arranged to be operated automatically in response to the operation of any one of said automatic switching means.

25. In combination, a direct current supply circuit, a multi-voltage direct current load circuit, a plurality of balancer sets for supplying said multi-voltage load circuit, each balancer set having the rotors thereof mechanically connected together and the armature windings thereof electrically connected in series, a control circuit, automatic switching means associated with each set for connecting the series-connected armature windings of the respective set across said control circuit to effect the starting of the set and for connecting the common connections between the adjacent armature windings of the respective set to the intermediate conductors of the muli-voltage load circuit after the set has been started, starting means associated with each set arranged to be operated to effect the operation of the automatic switching means of the associated set, a common switching means for connecting said supply circuit to said control circuit arranged to be operated automatically in response to the operation of any one of said starting means, and a common switching means for connecting the control circuit to the main conductors of the load circuit arranged to be operated automatically in response to the operation of any one of said automatic switching means.

26. In combination, a direct current supply circuit, a multi-voltage direct current load circuit, a plurality of balancer sets each set comprising a plurality of dynamo-electric machines having their rotors mechanically connected together and their armature windings electrically connected in series, a control circuit, switching means associated with each set for connecting the series-connected armature windings of the respective set across said control circuit and for connecting the common connections between adjacent armature windings of the respective set to the intermediate conductors of the multi-voltage load circuit, switching means for connecting said control circuit to the main conductors of the load circuit, means responsive to the voltage across said control circuit for controlling the opening of both of said switching means, switching means for connecting said supply circuit to the control circuit, an overload responsive means associated with each machine of all of the balancer sets for controlling the opening of said last mentioned switching means.

27. In combination, a direct current supply circuit, a multi-voltage direct current load circuit, a plurality of balancer sets, each set comprising a plurality of dynamo electric machines having their rotors mechanically connected together and their armature windings electrically connected in series, a control circuit, switching means associated with each set for connecting the series-connected armature windings of the respective set across said control circuit and for connecting the common connections between adjacent armature windings of the respective set to the intermediate conductors of the multi-voltage load circuit, switching means for connecting said control circuit to the main conductors of the load circuit, means responsive to the voltage across said control circuit for controlling the opening of both of said switching means, electroresponsive means for connecting said supply circuit to the control circuit, a circuit for said electroresponsive means, a fuse in the armature circuit of each dynamo electric machine of each balancer set, a relay in shunt around each fuse, and contacts in the circuit of said electroresponsive means controlled by said relays.

28. In combination, a direct current supply circuit, a multi-voltage direct current load circuit, a plurality of balancer sets for supplying said multi-voltage load circuit, automatic switching means associated with each set for effecting the starting of the respective set and the connection thereof to the multi-voltage load circuit, means associated with each set adapted to be operated to effect the operation of the automatic switching means associated therewith, means operative in response to an overload on any one of the balancer sets to disconnect the supply circuit from all of the balancer sets in operation and subsequently to disconnect all of the balancer sets from the load circuit when the voltage thereof has decreased below a predetermined value, means responsive to an overload on any one set for preventing the subsequent operation of the automatic switching means associated therewith, and means operative when all of the sets have been disconnected from the load circuit in response to an overload on one of the sets to effect the operation of the automatic switching means of all of the sets which were in operation when the overload occurred except the one which was overloaded.

29. In combination, a direct current supply circuit, a multi-voltage direct current load circuit, a plurality of balancer sets for supplying said multi-voltage load circuit, automatic switching means associated with each set for effecting the starting of the respective set and the connection thereof to the multi-voltage load circuit, means associated with each set adapted to be operated to effect the operation of the automatic switching means associated therewith, means operative in response to an overload on one of said balancer sets to disconnect the balancer set from the supply circuit and subsequently to disconnect the balancer set from the load circuit when the voltage thereof decreases below a predetermined value, means operative in response to an overload on any one of said balancer sets for preventing the subsequent operation of the automatic switching means associated therewith, and means operative after said one of said balancer sets has been disconnected from the load circuit in response to an overload for effecting the operation of the automatic switching means associated with another one of said plurality of balancer sets.

30. In combination, a direct current supply circuit, a multi-voltage direct current load circuit, a balancer set for supplying said multi-voltage load circuit, electroresponsive means for controlling the connection between said balancer set and said supply circuit, switching means for connecting said set to said multi-voltage load circuit, overload responsive means, and a circuit for said electroresponsive means controlled by said switching means and said overload responsive means.

31. In combination, a direct current supply circuit, a multi-voltage direct current load circuit, a balancer set for supplying said multi-voltage load circuit comprising a plurality of dynamo electric machines having their rotors mechanically connected together and their armature windings electrically connected in series, a control circuit, electroresponsive means for connecting said control circuit to said supply circuit, switching means for connecting said balancer set to said control circuit, switching means for connecting said control circuit to the main conductors of the multi-voltage load circuit, a circuit for said electroresponsive means, and means controlled by said last mentioned switching means for preventing the closing of said circuit of said electroresponsive means when said control circuit is connected to the main conductors of said multi-voltage load circuit.

32. In combination, a direct current supply circuit, a multi-voltage direct current load circuit, a balancer set for supplying said multi-voltage load circuit comprising a plurality of dynamo electric machines having their rotors mechanically connected together and their armature windings electrically connected in series, a control circuit, electroresponsive means for connecting said control circuit to said supply circuit, switching means for connecting said balancer set to said control circuit, switching means for connecting said control circuit to the main conductors of the multi-voltage load circuit, a circuit for said electroresponsive means, and overload responsive means in the armature circuit of each machine of said balancer set for controlling said circuit of said electroresponsive means.

33. In combination, a direct current supply circuit, a multi-voltage direct current load circuit, a balancer set for supplying said multi-voltage load circuit comprising a plurality of dynamo electric machines having their rotors mechanically connected together and their armature windings electrically connected in series, shunt field windings for said machines, switching means for connecting said series-connected armature windings and said shunt field windings across said supply circuit, switching means for connecting said balancer set to said multi-voltage load circuit, and means responsive to the current through said field winding for controlling said last mentioned switching means.

34. In combination, a direct current supply circuit, a multi-voltage direct current load circuit, a balancer set for supplying said multi-voltage load circuit comprising a plurality of dynamo electric machines having their rotors mechanically connected together and their armature windings electrically connected in series, shunt field windings for said machines, switching means for connecting said series-connected armature windings and said shunt field windings across said supply circuit, electroresponsive means for connecting said balancer set to said multi-voltage load circuit, a circuit for said electroresponsive means, and contacts in said circuit of said electroresponsive means controlled by the current in said field windings.

35. In combination, a direct current supply circuit, a multi-voltage direct current load circuit, a balancer set for supplying said multi-voltage load circuit comprising a plurality of dynamo electric machines having their rotors mechanically connected together and their armature windings electrically connected in series, shunt field windings for said machines, switching means for connecting said series-connected armature windings and said shunt field windings across said supply circuit, electroresponsive means for connecting said balancer set to said multi-voltage load circuit, a circuit for said electroresponsive means, contacts in said circuit of said electroresponsive means controlled by the current in said field windings, and means controlled by said electroresponsive means for controlling said switching means.

36. In combination, a direct current supply circuit, a multi-voltage load circuit, a balancer set for supplying said multi-voltage load circuit, automatic switching means for connecting said set to said supply circuit and for controlling the connection thereto to effect the starting of said set, other switching means for automatically connecting said set to the load circuit when the starting operation has been completed, starting means adapted to be operated to effect the operation of said automatic switching means, a time relay arranged to effect the disconnection of said set from said supply circuit and to prevent the operation of said automatic switching means, and a circuit for said time relay controlled by said starting means and said other switching means.

37. In combination, a direct current supply circuit, a multi-voltage load circuit, a plurality of balancer sets for supplying said multi-voltage load circuit, automatic switching means associated with each set for connecting the respective set to said supply circuit and to said load circuit, starting means associated with each set adapted to be operated to effect the operation of the automatic switching means associated therewith, a time relay associated with one of said sets and arranged to effect the operation of the automatic switching means associated with another one of said sets, and a circuit for said time relay controlled by the starting means and the automatic switching means of the set with which said relay is associated.

In witness whereof, I have hereunto set my hand this 14th day of May, 1924.

ELMER F. BLISS.